H. H. SCHROEDER.
TRACE-FASTENER.
No. 192,458.          Patented June 26, 1877.
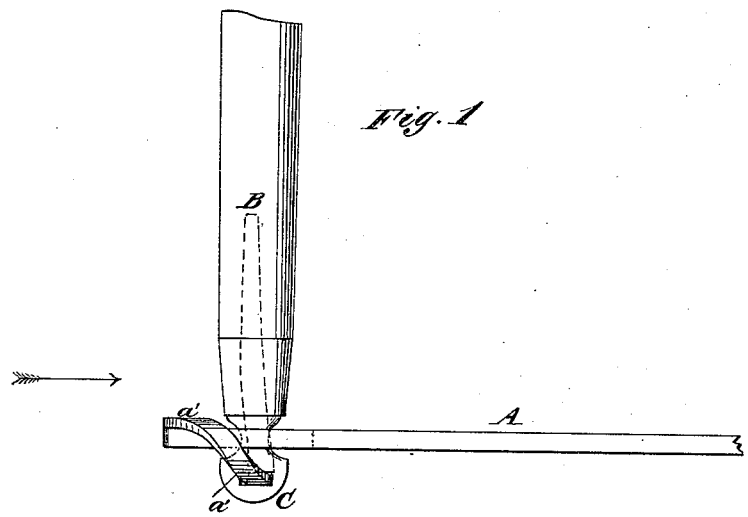
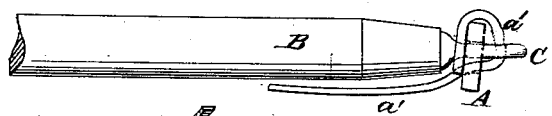
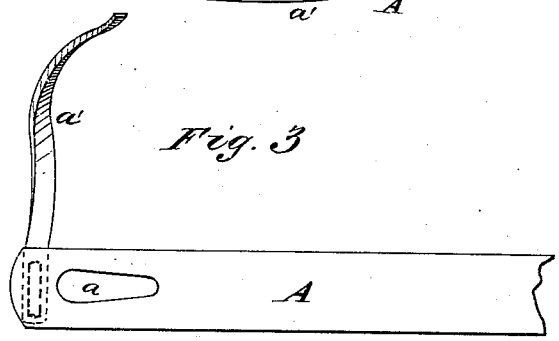

UNITED STATES PATENT OFFICE.

HENRY H. SCHROEDER, OF NEW MILFORD, CONNECTICUT.

IMPROVEMENT IN TRACE-FASTENERS.

Specification forming part of Letters Patent No. 192,458, dated June 26, 1877; application filed April 30, 1877.

*To all whom it may concern:*

Be it known that I, HENRY H. SCHROEDER, of New Milford, in the county of Litchfield and State of Connecticut, have invented a new and useful Improvement in Trace-Fasteners; and I do hereby declare that the following is a full, clear, and exact description thereof, reference being had to the accompanying drawing, forming a part of this specification, in which—

Figure 1 represents a plan view of one end of an ordinary whiffletree and trace attached, containing my invention. Fig. 2 is a rear view of the same, and Fig. 3 a view of the trace detached and connected fastener.

Similar letters of reference indicate corresponding parts in the several figures.

This invention relates to devices for preventing traces from becoming accidentally detached from a whiffletree, to which they are usually connected with a vehicle; and the invention consists in securing one end of a short strap of leather or other flexible material to the side of the trace near the eye thereof, so that the free end of said strap may be passed through an aperture arranged near the end of the whiffletree, and also continued through the eye of the trace, all as hereinafter fully described.

Heretofore a similar device has been affixed to the whiffletree by means of nails, and its free end passed over the connected trace, and through an aperture arranged near the end of said whiffletree.

My improvement is designed to overcome certain objections attending the latter arrangement.

In the drawing, A represents a trace provided with an eye, $a$; and B C a whiffletree of the usual construction.

The fastening device consists of a short strap, $a'$, secured at one end to the side of the trace A near the eye $a$, and its opposite end left free, as shown in Fig. 3. When the trace is connected to the whiffletree, the free end of the strap $a'$ is passed through an aperture arranged near the end of said whiffletree in the usual manner.

If desired, the free end of the strap may be continued through the eye $a$ of the trace, and beneath the whiffletree, as shown in Fig. 2.

By securing the strap $a'$ to the side of the trace between the eye $a$ and rear end thereof, as shown in Fig. 3, the trace is materially strengthened and re-enforced at this point, and the eye is not so liable to be torn out; and, further, this strap being usually made of leather, it can be more firmly attached to the trace by stitching than to the whiffletree by nailing, and it is a well-known fact that the latter mode is a constant source of trouble; and, further, by connecting this strap to a painted portion of the vehicle, and subjecting it to materials employed in cleansing the latter, its strength and appearance are soon destroyed.

By connecting this device to the trace the above-mentioned difficulties are avoided, and, in connecting the trace to the vehicle, it is not so liable to be disregarded.

Having thus fully described my invention, what I claim, and desire to secure by Letters Patent, is—

A trace for harness having the strap $a'$ secured at one end thereof near the eye $a$, and having its free end adapted to pass through an aperture in the whiffletree, substantially as described.

HENRY H. SCHROEDER.

Witnesses:
G. N. PECK,
JOHN F. SCHROEDER.